US009118671B2

(12) United States Patent
Novack et al.

(10) Patent No.: US 9,118,671 B2
(45) Date of Patent: *Aug. 25, 2015

(54) VOICE OVER IP BASED VOICE BIOMETRIC AUTHENTICATION

(71) Applicant: INTERACTIONS LLC, Franklin, MA (US)

(72) Inventors: Brian M. Novack, St. Louis, MO (US); Daniel Larry Madsen, Castro Valley, CA (US); Timothy R. Thompson, O Fallon, MO (US)

(73) Assignee: Interactions LLC, Franklin, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,588

(22) Filed: Nov. 18, 2013

(65) Prior Publication Data
US 2014/0075530 A1 Mar. 13, 2014

Related U.S. Application Data

(63) Continuation of application No. 13/171,600, filed on Jun. 29, 2011, now Pat. No. 8,615,219, which is a continuation of application No. 11/769,469, filed on Jun. 27, 2007, now Pat. No. 7,995,995, which is a continuation of application No. 10/902,085, filed on Jul. 30, 2004, now Pat. No. 7,254,383.

(51) Int. Cl.
*H04M 1/00* (2006.01)
*H04L 29/06* (2006.01)
(Continued)

(52) U.S. Cl.
CPC ............ *H04L 63/0861* (2013.01); *G06F 21/32* (2013.01); *H04M 3/38* (2013.01);
(Continued)

(58) Field of Classification Search
CPC ..... H04W 12/00; H04W 12/02; H04W 12/06; H04W 12/08; H04W 12/10
USPC ........... 455/410, 411, 414.1, 412.1, 413, 418, 455/419, 420, 445, 450
See application file for complete search history.

(56) References Cited

U.S. PATENT DOCUMENTS

| 5,130,985 A | 7/1992 | Kondo et al. |
| 5,276,444 A | 1/1994 | McNair |

(Continued)

FOREIGN PATENT DOCUMENTS

| JP | 2003-44444 | 2/2003 |
| JP | 2003-44445 | 2/2003 |

(Continued)

OTHER PUBLICATIONS

Le et al., "Efficient and Robust Header Compression for Real-Time Services", IEEE Wireless Communication and Networking Conference, vol. 2, 2000, pp. 924-928.

(Continued)

*Primary Examiner* — Jean Gelin
(74) *Attorney, Agent, or Firm* — Fenwick & West LLP

(57) ABSTRACT

A request from a party is received by a receiver from a remote system. The request from the party is received when the party attempts to obtain a service using the remote system. A selective determination is made to request, over a network, authentication of the party by a remote biometric system. A request is sent to the remote system for the party to provide a biometric sample responsive to determining to request authentication of the party. The service is provided contingent upon authentication of the party by the remote biometric system.

20 Claims, 8 Drawing Sheets

(51) Int. Cl.
*G06F 21/32* (2013.01)
*H04M 3/38* (2006.01)
*H04M 7/00* (2006.01)
*H04W 12/06* (2009.01)
*H04W 12/02* (2009.01)
*H04W 12/08* (2009.01)

(52) U.S. Cl.
CPC ......... *H04M 7/006* (2013.01); *H04M 2201/41* (2013.01); *H04M 2203/6045* (2013.01); *H04W 12/02* (2013.01); *H04W 12/06* (2013.01); *H04W 12/08* (2013.01)

(56) References Cited

U.S. PATENT DOCUMENTS

| | | |
|---|---|---|
| 5,711,011 A | 1/1998 | Urs et al. |
| 5,757,916 A | 5/1998 | MacDoran et al. |
| 5,870,723 A | 2/1999 | Pare et al. |
| 5,930,804 A | 7/1999 | Yu et al. |
| 5,940,476 A | 8/1999 | Morganstein et al. |
| 5,970,143 A | 10/1999 | Schneier et al. |
| 5,987,232 A * | 11/1999 | Tabuki ............... 726/5 |
| 5,991,277 A | 11/1999 | Maeng et al. |
| 6,016,476 A | 1/2000 | Maes et al. |
| 6,076,167 A * | 6/2000 | Borza ................ 726/5 |
| 6,104,998 A | 8/2000 | Galand et al. |
| 6,167,517 A | 12/2000 | Gilchrist et al. |
| 6,370,163 B1 | 4/2002 | Shaffer et al. |
| 6,389,038 B1 | 5/2002 | Goldberg et al. |
| 6,493,437 B1 | 12/2002 | Olshansky |
| 6,658,414 B2 | 12/2003 | Bryan et al. |
| 7,054,811 B2 | 5/2006 | Barzilay |
| 7,054,819 B1 | 5/2006 | Loveland |
| 7,107,220 B2 | 9/2006 | Novack et al. |
| 7,187,678 B2 | 3/2007 | Cunetto et al. |
| 7,215,755 B2 | 5/2007 | Novack |
| 7,356,475 B2 | 4/2008 | Novack et al. |
| 7,548,981 B1 * | 6/2009 | Taylor et al. .......... 709/227 |
| 7,573,988 B2 | 8/2009 | Lee et al. |
| 7,813,273 B2 | 10/2010 | Pearson |
| 2001/0036172 A1 | 11/2001 | Haskal |
| 2001/0054085 A1 | 12/2001 | Kurganov |
| 2001/0055370 A1 | 12/2001 | Kommer |
| 2002/0126675 A1 | 9/2002 | Yoshimura et al. |
| 2002/0136217 A1 | 9/2002 | Christensen |
| 2002/0156626 A1 | 10/2002 | Hutchison |
| 2002/0181581 A1 | 12/2002 | Birru et al. |
| 2003/0031165 A1 | 2/2003 | O'Brien, Jr. |
| 2003/0046064 A1 | 3/2003 | Moriya et al. |
| 2003/0067922 A1 | 4/2003 | Yoshitani |
| 2003/0074317 A1 | 4/2003 | Hofi |
| 2003/0105966 A1 * | 6/2003 | Pu et al. ............ 713/186 |
| 2003/0123619 A1 | 7/2003 | McKinnon |
| 2003/0149744 A1 | 8/2003 | Bierre et al. |
| 2003/0156700 A1 | 8/2003 | Brown et al. |
| 2003/0163710 A1 | 8/2003 | Ortiz et al. |
| 2003/0229492 A1 | 12/2003 | Nolan |
| 2004/0001575 A1 | 1/2004 | Tang |
| 2004/0010697 A1 | 1/2004 | White |
| 2004/0017898 A1 | 1/2004 | Reynolds |
| 2004/0059923 A1 | 3/2004 | Shamrao |
| 2004/0068399 A1 | 4/2004 | Ding |
| 2004/0093211 A1 | 5/2004 | Reynolds et al. |
| 2004/0107108 A1 | 6/2004 | Rohwer |
| 2004/0250085 A1 * | 12/2004 | Tattan et al. ......... 713/186 |
| 2005/0063522 A1 | 3/2005 | Kim et al. |
| 2005/0096906 A1 | 5/2005 | Barzilay |
| 2006/0029190 A1 | 2/2006 | Schultz |
| 2007/0184817 A1 | 8/2007 | Karaoguz |
| 2012/0260098 A1 * | 10/2012 | Jacobs ............ 713/176 |

FOREIGN PATENT DOCUMENTS

| | | |
|---|---|---|
| KR | 10-2002-0045150 | 6/2002 |
| WO | 02/14984 | 2/2002 |

OTHER PUBLICATIONS

Thorne, "VoIP—The Access Dimension", BT Technology Journal, vol. 9, No. 2, Apr. 2001, pp. 33-43.
Gatens, "The Benefit of Low Bit Rate Voice Compression Technologies as Part of a Converged Network Deployment Strategy", Texas Instruments, DSL con Spring 2000, Apr. 4, 2000, http://www.focus.ti.com/pdfs/vf/bband/dsl_lbr.pdf.
"Single-Device Solution Eases VoIP-Over-DSL Deployments", Cisco ISO Software: Beyond Basis IP, vol. 3, Issue 1, <http://www.cisco.com/warp/public/779/servpro/promotions/bbip/ volume_03_issue01.html>.
"Making Voice-over-IP Perform as Advertised with QoS", Sitara Network, Inc., 1999-2000, <http://www.sitaranetworks.com/products/document_info.cfm? document=11>.
"Guidelines for VoIP Applications", MCK Communications, http://www.nwextension.com/pdf/VoIP%20Guidelines.pdf.
"Voice Over Digital Subscriber Line (VoDSL)", Net to Net Technologies, http://nettonet.com/solutions/whitepapers/emea-vodsl.pdf.
Erskine et al., "Voice Over DSL: Success with BLES", TMCnet.com http://www.tmcnet.com/tmcnet/articles/1101vp.htm (Nov. 2001).
"Voice Quality (VQ) in Converging Telephony and Internet Protocol (IP) Networks", IN-IP Wordrum, International Engineering Consortium, http://www.iec.org/online/tutorials/voice_qual/topic05.html (2002).
"VoIP Bandwidth Utilization and Packet Handling", net.com, http://www.net.com/products/voice_packet/pdf/shout_packet_wp.pdf (2001).
Knight, "Packetizing the Local Loop with Broadband Loop Emulation Services", CTI Network Telephony, http://www.tmcnet.com/articles/ctimag/0599/0599copper.htm (May 1999).
Casner et al., "Compressing IP/UDP/RTP Headers for Low-Speed Serial Links"; RFC2508, (Feb. 1999).
Degermark et al., "IP Header Compression", RFC2507, (Feb. 1999).
India Office action, mail date is Jan. 27, 2014.
India Office action, mail date is Mar. 13, 2013.
E.P.O. Office action, mail date is Feb. 7, 2013.
E.P.O. Search Report, mail date is Mar. 11, 2009.
E.P.O. Office Action, mail date is Mar. 25, 2009.
Korea Office action, mail date is Apr. 5, 2012, along with an English translation thereof.
International Telecommunications Union (ITU) telecommunication standard G.711, entitled "Pulse Code Modulation (PCM) of Voice Frequencies", (1993).
Voice and Multimedia Over ATM—Loop Emulation Service Using AAL2, The ATM Forum Technical Committee, AF-VMOA-0145.000, (Jul. 2000).
A screen-shot of a website entitled "IEEE Symposium on Computers and Communications (ISCC '95)", downloaded no later than May 2003.
A screen-shot of a website entitled "The Evolution of IP Routing Using MPLS", from http://http://people.aub.edu.lb/~webfea/courses/ee777/mpls.pdf, downloaded no later than May 2003.
U.S. Appl. No. 10/228,068 to Edmon et al., which was filed Aug. 2002.
U.S. Appl. No. 10/288,522 to Edmon et al., which was filed Nov. 2002.
Japan Office Action, mail date is May 24, 2011.

* cited by examiner

Verification System 200

VOICE OVER IP BASED VOICE BIOMETRIC AUTHENTICATION

CROSS-REFERENCE TO RELATED APPLICATIONS

The present application is a continuation application of pending U.S. application Ser. No. 13/171,600, filed on Jun. 29, 2011, which is a continuation of U.S. application Ser. No. 11/769,469, filed on Jun. 27, 2007, now U.S. Pat. No. 7,995,995, issued on Aug. 9, 2011, which is a continuation application of U.S. patent application Ser. No. 10/902,085, filed on Jul. 30, 2004, now U.S. Pat. No. 7,254,383, issued on Aug. 7, 2007, the contents of which are expressly incorporated by reference herein in their entireties.

BACKGROUND OF THE INVENTION

1. Field of the Invention

The present invention relates to authentication in communications networks. More particularly, the present invention relates to a biometric system that identifies a person over a communications network.

2. Background Information

A need exists to remotely identify a person over a communications network. In particular, a biometric service is needed that remotely authenticates a person's identity using the person's biometric characteristic information. For example, a voice over IP based biometric authentication system is needed that authenticates the identity of individuals calling communications platforms in a communications network.

Currently, a calling party can interact with an intelligent peripheral communications platform by pressing keys on a keypad to generate audible dual tone multifrequency (DTMF) signals. The intelligent peripheral communications platform translates the audible signals and provides speech information and instructions to the calling party. For example, the intelligent peripheral communications platform may instruct the calling party to enter an account number and password using the keypad. Access to a service may be restricted only to a calling party who can provide the correct password for a verifiable account. However, the intelligent peripheral communications platform does not identify the individual calling party using the dual tone multifrequency signals; rather, the intelligent peripheral communications platform only ensures that the calling party possesses the correct password for the account.

Additionally, an intelligent peripheral communications platform may accept and interpret speech from a calling party. The intelligent peripheral communications platform translates the calling party's speech and provides speech information and instructions to the calling party. For example, the intelligent peripheral communications platform may instruct the calling party to enunciate an account number and password. Access to a service may be restricted only to a calling party who can provide the correct password for the account. However, the intelligent peripheral communications platform does not identify the individual calling party using the calling party's speech; rather, the intelligent peripheral communications platform only ensures that the calling party possesses the correct password for the account.

Furthermore, a communications platform such as a voice mail system may use information associated with an address of the source of the call to allow access to an account. For example, the communications platform may use an automatic number identifier (ANI) or an internet protocol (IP) network address associated with the source of the call to recognize and authorize access to an account. Access to a service may be restricted only to a calling party calling from an authorized address associated with the account. However, the communications platform does not identify the individual calling party using the information associated with the telephone number; rather, the communications platform only ensures that the calling party is calling from an authorized address associated with the account.

Recently, an ability has been provided to identify an individual using biometric information. For example, voice characteristic information, facial geometry, DNA, iris scan information and fingerprints can be used to identify an individual. However, biometric authentication typically involves complex processing for a large amount of information. Accordingly, communications devices and communications platforms in a communications network may not have sufficient memory and processing ability to store and quickly process biometric information for individuals. For this reason and others, biometric authentication has not been used in a communications network to condition access to communications devices and communications platforms.

Accordingly, a need exists to provide a biometric authentication system in a communications network. In particular, a need exists to provide a biometric authentication system that authenticates identities and authorizes access to the services provided by communications devices and/or communications platforms in a communications network. For example, a biometric authentication system is needed that registers biometric information for an individual by associating the biometric information with identification information of the individual. Furthermore, a biometric authentication system is needed that receives a request from a communications platform or communications device to authenticate a calling party or customer as the individual by comparing biometric information obtained from the calling party or customer with the registered biometric information.

To solve the above-described problems, a system is provided for voice over IP based biometric authentication.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
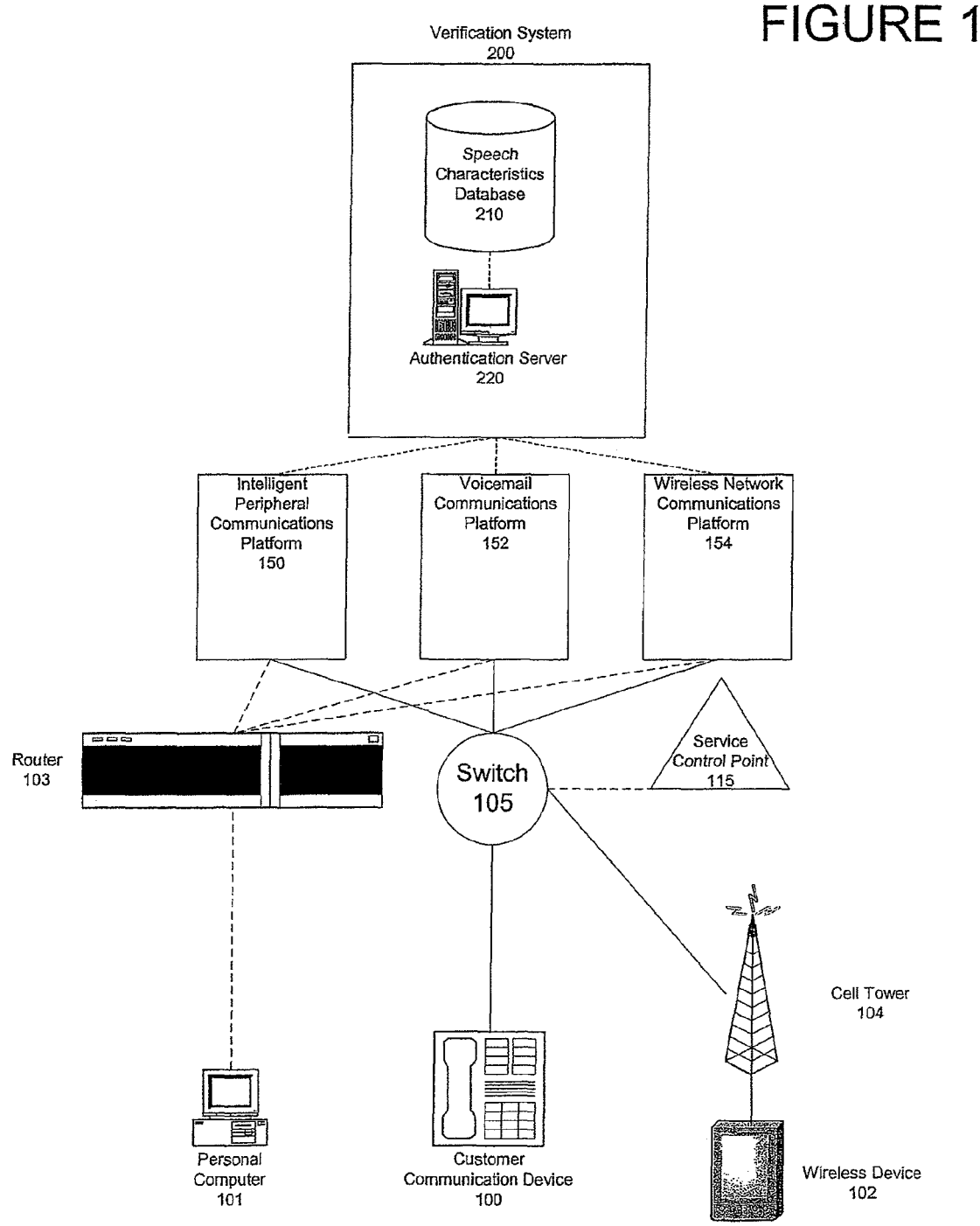
FIG. 1 shows an exemplary communications network architecture for voice over IP based biometric authentication, according to an aspect of the present invention.

In view of the foregoing, the present invention, through one or more of its various aspects, embodiments and/or specific features or sub-components, is thus intended to bring out one or more of the advantages as specifically noted below. According to an aspect of the present invention, a communication system is provided for verifying an identity of a calling party. The communication system includes a storage that stores voice sample information in association with information that identifies an individual. The communication system also includes a receiver that receives, from a communications platform called by the calling party, a request to authenticate the identity of the calling party as the individual, using a digital audio sample packetized according to voice over internet protocol and obtained from the calling party during the call. The communication system further includes a processor that compares the digital audio sample to the voice sample information to authenticate the identity of the calling party as the individual.

According to another aspect of the present invention, the processor de-packetizes the packetized digital audio sample to compare the digital audio sample to the voice sample information.

According to yet another aspect of the present invention, the receiver receives the request from the communications platform over the internet.

According to still another aspect of the present invention, the communications platform is an intelligent peripheral that forwards the request to authenticate the identity of the calling party to the receiver.

According to another aspect of the present invention, the communications platform is a voice mail system that forwards the request to authenticate the identity of the calling party to the receiver.

According to yet another aspect of the present invention, the communications platform is a wireless network platform that forwards the request to authenticate the identity of the calling party to the receiver.

According to still another aspect of the present invention, the system also includes a log generator that generates a record of information relating to the authentication request.

According to an aspect of the present invention, a method is provided for verifying an identity of a calling party. The method includes storing voice sample information in association with information that identifies an individual. The method also includes receiving, from a communications platform called by the calling party, a request to authenticate the identity of the calling party as the individual, using a digital audio sample packetized according to voice over internet protocol and obtained from the calling party during the call. The method further includes comparing the digital audio sample to the voice sample information to authenticate the identity of the calling party as the individual.

According to another aspect of the present invention, the method includes de-packetizing the packetized digital audio sample to compare the digital audio sample to the voice sample information.

According to yet another aspect of the present invention, the request to authenticate is received from the communications platform over the internet.

According to still another aspect of the present invention, the communications platform is an intelligent peripheral that forwards the request to authenticate the identity of the calling party.

According to another aspect of the present invention, the communications platform is a voice mail system that forwards the request to authenticate the identity of the calling party.

According to yet another aspect of the present invention, the communications platform is a wireless network platform that forwards the request to authenticate the identity of the calling party.

According to still another aspect of the present invention, the method also includes generating a record of information relating to the authentication request.

According to an aspect of the present invention, a computer readable medium stores a program that verifies the identity of a calling party. The computer readable medium includes a sample storing code segment that stores voice sample information in association with information that identifies an individual. The computer readable medium also includes a receiving code segment that receives, from a communications platform called by the calling party, a request to authenticate the identity of the calling party as the individual, using a digital audio sample packetized according to voice over internet protocol and obtained from the calling party during the call. The computer readable medium further includes a comparing code segment that compares the digital audio sample to the voice sample information to authenticate the identity of the calling party as the individual.

According to another aspect of the present invention, the computer readable includes a de-packetizing code segment that de-packetizes the packetized digital audio sample to compare the digital audio sample to the voice sample information.

According to yet another aspect of the present invention, the request to authenticate is received from the communications platform over the internet.

According to still another aspect of the present invention, the communications platform is an intelligent peripheral that forwards the request to authenticate the identity of the calling party.

According to another aspect of the present invention, the communications platform is a voice mail system that forwards the request to authenticate the identity of the calling party.

According to yet another aspect of the present invention, the communications platform is a wireless network platform that forwards the request to authenticate the identity of the calling party.

According to still another aspect of the present invention, the computer readable medium also includes a log generating code segment that generates a record of information relating to the authentication request.

A communications system is provided for authenticating a calling party's identity using voice over IP based biometric authentication. The communications system is provided in a communications network, and includes a communications device, a communications platform and a verification system.

As used in the present application, the calling party may be an individual, e.g., a customer, using a communications device to obtain access to a service supported by a communications platform. Furthermore, a call is an attempt by a calling party to communicate with a recipient at a destination.

In an embodiment, the communications network is a switch-based switching network that provided dedicated connections for calls between a calling party and a recipient of the call. The switch-based switching network may be an advanced intelligent network (AIN) that includes service switching points and service control points. In an advanced intelligent network, an individual communications device, such as a phone or modem, is connected to a service switching point that triggers when particular dialing patterns or sequences are input to the individual communications device. When the service switching point detects a predetermined dialing pattern, the service switching point sends a query via a signaling network to a service control point. The query to the service control point results in an instruction to forward the call from the service switching point to a communications platform. Of course, calls may be routed from the service switching point to the communications platform without invoking a service control point when neither the originating telephone number of the calling party or the destination telephone number of the communications platform triggers the service switching point.

In another embodiment, the communications network is a packet-switching network, such as the internet. In a packet-switching network, packets carry processing information so that each packet can be individually routed. Accordingly, dedicated connections are unnecessary in a packet-switching network. As an example, an individual communications device, such as an internet-enabled computer, personal digital assistant (PDA) or other device with a browser, is connected to a router that routes packetized data to a communications platform. The communications platform may be a dedicated application server or any other type of communications apparatus that provides services over a communications network.

In yet another embodiment, the communications network is a secure network, such as a private network or a virtual private network. In a virtual private network, communications are limited to only a predetermined subset of devices in a larger network. As an example, an individual communications device, such as an automatic teller machine or credit card reader, routes data to a communications platform through a private or virtual private network. The communications platform may be a dedicated server that only provides a service to the predetermined subset of communications devices on the larger network.

In still another embodiment, the communications network is a wireless network. Accordingly, the communications network can be any type of network that is used to route communications. Of course, the communications network may be any combination or sub-combination of networks used to route communications, including wireline networks, wireless networks, packet-switching networks and switch-based switching networks.

In an embodiment, the communications platform is an intelligent peripheral that corresponds to a telephone number on a switch-based switching network and/or an IP address on a packet-switching network. A telephone call or data packet may be routed to the communications platform over elements of either (or both) networks. The switch-based switching network can be used to provide a dedicated connection from the calling party to the intelligent peripheral, while the packet-switching network can be used to route, e.g., voice over internet protocol (VoIP), packets to the intelligent peripheral.

The communications platform provides a service for secure network calls, switch-based switching network calls and/or packet-switching network calls. The communications platform restricts access to at least a portion of services to only authorized calling parties. Accordingly, when communications are received, the communications platform interacts with the calling party until the communications platform determines that the identity of the calling party must be established. When the communications platform determines that the identity of the calling party must be established, the communications platform interacts with a verification system to initiate a verification session. The communications platform obtains biometric samples from the calling party and provides the biometric samples to the verification system.

The verification system receives the biometric samples from the communications platform and authenticates the biometric samples as originating from the individual. When, during the interaction between the calling party and the communications platform, a determination is made that the authentication functionality of a verification system should be requested, the communications platform initiates communications with the verification system, using the internet or another packet-switching network. The verification system interacts with the communications platform until the functionality of the verification system is no longer needed. The verification system may be implemented in a distributed manner. For example, a communications network may include a centralized processor that retrieves data from distributed databases. Alternatively, the communications network may include a centralized processor that receives requests from clients, analyzes the requests (and associated biometric information), and forwards the requests to secondary processors according to the type of information being processed. FIG. 1 shows an exemplary communications network architecture for centralized biometric authentication. As shown, an individual communications device 100 is a telephone connected to a representative switch 105 of the public switched telephone network (PSTN). In an alternative embodiment, an individual communications device 102 is a cellular telephone or other wireless device that communicates with the representative switch 105 via a cellular tower 104. In another embodiment, a personal computer 101 communicates via a router 103 instead of the switch 105. The individual communications devices may operate in a pass-through mode, wherein a calling party interacts with a communications platform and/or biometric verification system seamlessly to perform various security functions. Alternatively, the device may operate in an active mode, in which the device interacts with the calling party to collect the necessary biometric data that is used in an interaction with the centralized security service.

According to an embodiment of the present invention, the switch 105 is set with an originating trigger that responds to a particular dialing pattern, such as an 800 dialing pattern used for a communications service. In response to the trigger, the switch 105 suspends the call and launches a query to a service control point 115. The switch 105 and the control point 115 communicate with each other over a data network using a standard interface protocol. Data links in FIG. 1 are shown as broken line segments. In an embodiment, the interface protocol used to communicate between the switch 105 and the control point 115 is SS7 protocol. The control point 115 instructs the switch 105 to forward the call to a communications platform 150, 152 or 154, based on a translation of the query by the control point 115. The switch 105 forwards the call to the communications platform 150, 152 or 154 through the switch-based switching network. According to another aspect of the present invention, the router 103 routes packets according to a packet-switching protocol, e.g., transmission control protocol/internet protocol (TCP/IP). The router routes, e.g., voice over internet protocol (VOIP), packets to a communications platform 150, 152 or 154 through a packet-switching network.

The communications platform 150, 152 or 154 may be an interactive voice response device or another type of intelligent peripheral device provisioned with interactive voice response functionality. An exemplary telecommunications system using intelligent peripherals and service node/intelligent peripherals is disclosed in U.S. patent application Ser. No. 10/608,076 to NOVACK, filed Jun. 30, 2003, the disclosure of which is expressly incorporated by reference herein in its entirety. An exemplary method of using intelligent peripherals and service node/intelligent peripherals is disclosed in U.S. patent application Ser. No. 10/751,685 to NOVACK et al., filed Jan. 5, 2004, the disclosure of which is expressly incorporated by reference in its entirety. Exemplary interactive voice response devices include an IBM Resource Manager, a Lucent Compact Service Node or a Lucent Enhanced Media Resource Server (eMRS). The communications platform 150, 152 or 154 plays an introductory message to the calling party. The introductory message may include a request for the calling party to input information by speaking or pressing buttons on a keypad to generate dual-tone multi frequency (DTMF) tones. The buttons on the keypad each correspond to a distinctive DTMF tone that is received by the communications platform 150, 152 or 154. When the communications platform 150, 152 or 154 receives information indicating that the calling party needs to be identified and authenticated, the communications platform 150, 152 or 154 instructs the calling party to provide a voice sample that is packetized according to the voice over internet protocol and forwarded from the communications platform to a verification system 200.

The communications platform 150, 152 or 154 may be a service node/intelligent peripheral that independently determines a sequence of instructions to forward to the calling party. A service node/intelligent peripheral (SN/IP) can be a computer or communications server linked to the switch via, for example, an ISDN link using either ISDN-BRI (Basic Rate Interface) or an ISDN-PRI (Primary Rate Interface) protocol, each of which is known in the art. The SN/IP may alternatively be linked to the switch by, e.g., an analog line, a data line, or other voice and/or data circuits. A SN/IP may provide speech recognition, text-to-speech/speech-to-text conversion and dual-tone multi-frequency (DTMF) recognition with external telephony resources. In an embodiment, the communications platform 150, 152 or 154 may be an intelligent peripheral that provides the responses to, and receives instructions from, a control point (not shown). The control point processes data from the sequence of signals received from the calling party and determines the response to provide to the calling party. The communications platform 150, 152 or 154 and such a control point communicate over a signaling network such as the SS7 network. An intelligent peripheral may internally translate data messages received from a service control point through the SR-3511 protocol, the use of which enables simultaneous compatibility with interactive voice response functionality.

The communications platform 150, 152 or 154 processes calls according to a scripted call flow. The call flow may vary depending on the information provided by the calling party. The call flow proceeds until the communications platform 150, 152 or 154 determines that the identity of a calling party needs to be verified, at which time the verification system 200 is contacted by the communications platform 150, 152 or 154 as part of the scripted call flow. As an example, the verification system 200 is contacted as a result of the calling party requesting a function that requires authentication of the identity of the calling party. The communications platform 150, 152 or 154 is informed of the verification result by the verification system 200.

The call flow logic of the communications platform 150, 152 or 154 may be loaded into the communications platform 150, 152 or 154 if it is a service node/intelligent peripheral. Alternatively, the call flow logic is loaded into a control point that is associated with the communications platform 150, 152 or 154 and that controls at least part of the call flow of the communications platform 150, 152 or 154.

The communications platform 150, 152 or 154 and the verification system 200 interact until the verification system 200 determines whether the identity of the calling party can be established. The communications platform 150, 152 or 154 communicates with the verification system 200 through a network. Of course, the packets may be routed through a wide area network and/or a local area network when, e.g., the verification system 200 and the communications platforms 150, 152 and/or 154 are operated by the same entity. In an embodiment, the verification system 200 may only accept packetized data from one or more communications platforms 150, 152, 154, so that a calling party is blocked from communicating with the verification system 200 directly.

The verification system 200 includes an authentication server 220 that processes the information from the communications platforms 150, 152 and/or 154. The information from the communications platforms 150, 152 and/or 154 may include an expected identity of the calling party, voice samples of the calling party packetized according to voice over internet protocol, and any other information that would be useful to authenticate the calling party as desired by the communications platforms 150, 152, 154.

Additionally, the verification system 200 includes a speech characteristics database 210 that stores pre-registered voice information and/or identifying information for one or more individuals. The authentication server 220 retrieves the voice information from the speech characteristics database 210 and compares the retrieved voice information with the voice samples received from the communications platform. The identity of the calling party is authenticated when the comparison results in a determination that one or more characteristics of the voice samples bear adequate similarities to the voice information from the speech characteristics database 210.

As an example of the uses of the communications network architecture shown in FIG. 1, a communications service provider may allow subscribers to review voicemail service information by calling a service number corresponding to the voicemail communications platform 152. The voicemail communications platform may be used to provide a security mechanism to a voice mail system, replacing existing PIN-based techniques. The communications service provider may allow the calling party to request changes to the service using the voicemail communications platform 152. However, the communications service provider may require authentication of the calling party before processing a particular request for a change in service, such as a change of password. Accordingly, when the call flow of the call to the voicemail communications platform 152 reaches the point where the calling party requests to update their service information, the voicemail communications platform 152 initiates the voice over internet protocol session with the verification system 200. The verification system 200 receives the voice over internet protocol packets and compares the voice samples to the voice information in the speech characteristics database 210.

As another example of the uses of the communications network architecture shown in FIG. 1, the intelligent peripheral communications platform 150 may be used by a financial institution to allow a calling party to access an account. However, the financial institution may require the calling party to provide additional information in order to perform a transaction. Accordingly, the verification system 200 may be used to match information of the calling party with information of the account-holder.

As yet another example, the verification system 200 may be used to change passwords and personal identification numbers for a subscriber of a wireless network that provides the wireless network communications platform 154. As described above, the verification system 200 may be used to authenticate the identity of a calling party before allowing the calling party to request changes in personal identification numbers for accounts.

As still another example, the verification system 200 may be used to ensure that a calling is authorized to use a phone, replacing existing PIN based techniques. For example, the verification system 200 may be contacted, e.g., by a switch or router, without notifying the calling party when a question exists as to whether the calling party is using a communications device without authorization. Accordingly, the verification system 200 may be used, e.g., by a wireless telecommunications service provider, to deny a communications device access to an entire network, rather than only a particular communications platform in the network.

Accordingly, the communications system of FIG. 1 enables voice over IP based biometric authentication so that the functionality of the verification system 200 can be used to enhance the service provided by the communications platform 150, 152 or 154. The interaction between the communications platform 150, 152 or 154 and the verification system 200 may occur over the internet or any other packet-switching network that supports direct or indirect communication between the communications platforms 150, 152, 154 and the verification system 200. Additionally, the calling party may initially establish a telephone call or any of an internet interaction, a Web interaction and/or a data interaction with the communications platforms 150, 152, 154. The communications platform may then provide a voice over IP conduit to a security service that interacts with the calling party to establish identity at a variety of levels of authentication. Once established, the calling party's authenticated identity can be used as the means by which authorization decisions should be made.

Figure 2:
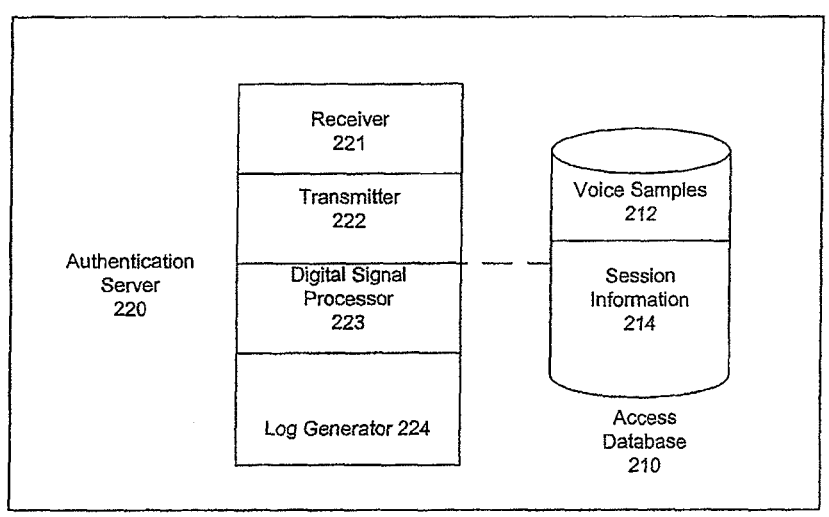
FIG. 2 shows an exemplary verification system for voice over IP based biometric authentication, according to an aspect of the present invention.

FIG. 2 is an exemplary verification system 200 for voice over IP based biometric authentication. As shown, the authentication server 220 includes a receiver 221. The receiver may receive information across one or more ports that accept communications of protocols used by one or more applications provided by the authentication server 220. The authentication server 220 also includes a transmitter 222 that forward information across the ports according to the protocols used by the applications provided by the authentication server 220. The receiver 221 receives packets of information over the internet and the transmitter 220 sends packets of information over the internet.

The authentication server 220 also includes a digital signal processor 223. The digital signal processor processes information after it is received by the receiver 221 or before it is sent by the transmitter 222. In this regard, the digital signal processor may depacketize audio samples embedded in a voice over IP packet. In particular, a voice over IP packet includes digitized information (i.e., bits) of a communications sample. The sample can be a digital representation of an analog signal over a discrete time period. The analog signal is continuously sampled and converted into digital samples that are carried by a sequence of packets. An internet protocol packet typically includes audio samples taken over a continuous period from 5 to 50 milliseconds.

As an example, a G.711 encoded digital sample is eight bits including, in order, a sign bit, a three bit exponent and a four bit mantissa. G.711 is a pulse code Modulation (PCM) standard of the International Telecommunication Union (ITU). The G.711 standard encompasses μ-law pulse code modulation (PCM) coding and A-law pulse code modulation coding. The most commonly used standard for land lines in, e.g., North America, is μ-law, while A-law pulse code modulation is the commonly used standard for land lines in, e.g., Europe.

Both A-law and μ-law PCM coding are used for compressing and expanding digital audio samples. A-law and μ-law pulse code modulation coding map fourteen bit linearly coded digital audio samples to logarithmic code samples. An additional benefit of A-law and μ-law coding is the reduced amount of bandwidth required to transmit the eight bit samples. The process of generating packets that include sequential digital communications samples is called packetization.

As described above, a packet refers to a set of digital information. The packets may be transmitted over a packet-switched network according to a packet-switching protocol. Exemplary packet switching protocols include the transmission control protocol (TCP), the user data protocol (UDP), the internet protocol (IP), the voice over internet protocol (VoIP), and the multiprotocol label switching (MPLS) protocol. The voice over internet protocol includes, for example, "Packet Based Multimedia Communications Systems" as defined by the ITU.

Packet switching protocols standardize the format for packet addressing, and routing and processing of information so that each node of a packet-switched network that receives a packet can examine the packet information and independently determine how best to continue routing and/or processing the packet. For example, an internet protocol packet includes three priority bits that can be used to prioritize, e.g., the processing of the packet at the nodes of the packet-switched network.

The communications platforms 150, 152, 154 packetize speech that is received from a switch-based switching network. The packetized speech is forwarded to the verification system 200 over the internet. When the speech is received from a router 103 over a packet-switched switching network, the speech is already packetized. However, the communications platforms 150, 152, 154 may depacketize such packets from the calling party in order to process the speech by, e.g., determining that the packets include requested voice samples. In any case, the communications platforms 150, 152 and 154 provide packetized digital audio samples to the verification system 200 according to voice over internet protocol. Accordingly, the digital signal processor 223 of the authentication server 220 depacketizes the packets to obtain speech samples and compares the depacketized speech samples to voice information stored in the voice sample section 212 of the access database 210.

Speech signals are typically very complex functions of the calling party and the background and transmission environment. Accordingly, the stored audio samples may be a stochastic model of the speaker, based on speaker characteristics extracted from so-called "training" speech samples. The voice characteristics may include a pitch period, rhythm, tone, spectral magnitude, frequencies and bandwidths of an individual's voice. Exemplary pre-packaged voice recognition software implementations are available from ScanSoft Inc. of Peabody, Mass. or from Nuance of Menlo Park, Calif.

If the depacketized audio samples match the stored voice sample information, the calling party is authenticated. In this regard, the depacketized digital audio samples do not necessarily have to exactly match the stored audio samples; rather, parameters may be provided to determine when a match occurs. For example, a calling party's identity may be authenticated based on a scoring system. The calling party may be authenticated if the confidence of a match is 98% for each of several different categories, e.g., pitch, range of pitch, pronunciation, accent, etc.

A log generator 224 stores information related to an authentication attempt. The log generator generates information including call and voice information that can then be used to support audit efforts. For example, the log generator 224 may store information that indicates who the communications platform 150, 152 or 154 expects to be identified, e.g., "John Smith, (703) 555-1212" or "John Smith, account number 111-22-3333". The log generator 224 may also store voice information from the received voice over IP packets to ensure that a record is kept of the voice samples provided by a calling party who requests to be authenticated. The information from the log generator 224 is stored in the session information section 214 of the access database 210.

Figure 3:
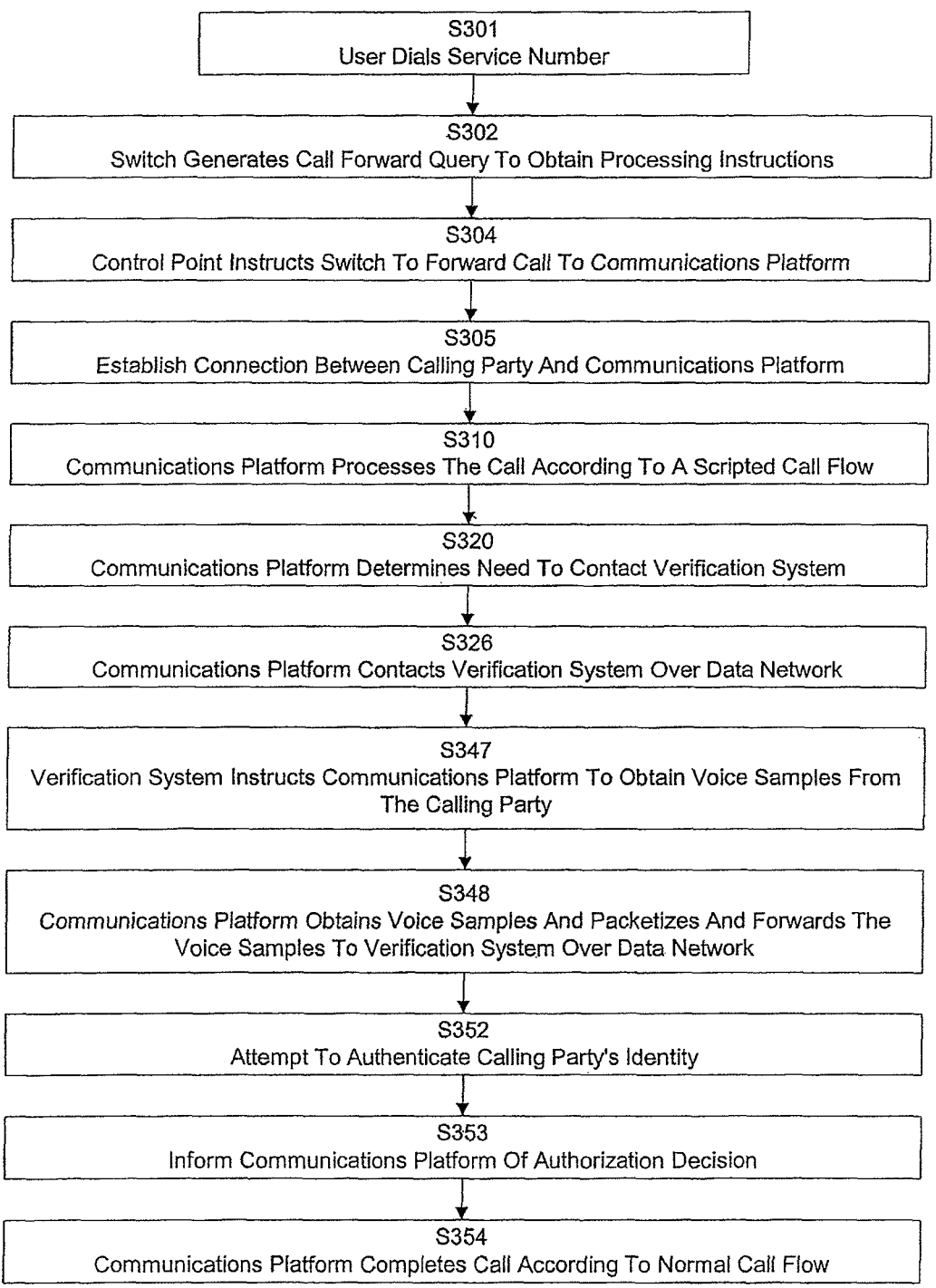
FIG. 3 is an exemplary flow diagram showing a method of authenticating an individual calling party using voice over IP based biometric authentication, according to an aspect of the present invention.

FIG. 3 shows an exemplary method of authenticating an individual calling party using voice over IP based biometric authentication. The process starts when the user dials a service number at S301 to obtain the services provided by one of the communications platforms 150, 152, 154. At S302, the switch 105 generates a "Call Forward" query to obtain processing instructions from the control point 115. At S304, the control point 115 instructs the switch 105 to forward the call to a communications platform 150, 152 or 154. At S305, a connection is established between the calling party and the communications platform 150, 152 or 154.

The call is processed at S310 according to a scripted call flow. In particular, the communications platform 150, 152 or 154 follows a predetermined script and requests information from the calling party. The script logic may branch depending on information provided by the calling party. As an example, the script may include instructions such as "Press 1 if you wish to request a withdrawal, Press 2 if you wish to speak to a customer service representative".

At S320, the script reaches a point where the communications platform 150, 152 or 154 determines a need to contact the verification system 200 to authenticate the calling party. At S326, the communications platform contacts the verification system 200 over a packet-switched network that enables data communications according to a packet-switching protocol. For example, the communications platform 150, 152 or 154 may send a session initiation request to request the services of the verification system 200. At S347, the verification system 200 instructs the communications platform 150, 152 or 154 to obtain speech samples from the calling party. For example, the verification system 200 may instruct the communications platform 150, 152 or 154 to request the calling party to enunciate a phrase, e.g., "A-B-C-D-E-F-G". The communications platform 150, 152 or 154 obtains the voice samples from the calling party, and provides the voice samples in voice over IP packets to the authentication server 220 at S348.

At S352, the authentication server 220 makes an authentication determination by processing the received voice samples and determining whether the calling party is verifiable as the expected individual according to a minimum score or probability. The verification system 200 informs the communications platform 150, 152 or 154 of the authentication decision and the communications platform 150, 152 is informed of the authentication decision at S353. The communications platform 150, 152 or 154 completes the call according to the script at S354. If the calling party is not authenticated as the expected individual, the calling party may be informed to contact a customer service representative. Accordingly, the verification system 200 ensures that confidential information or decision-making authority is not provided to an imposter.

Figure 4:
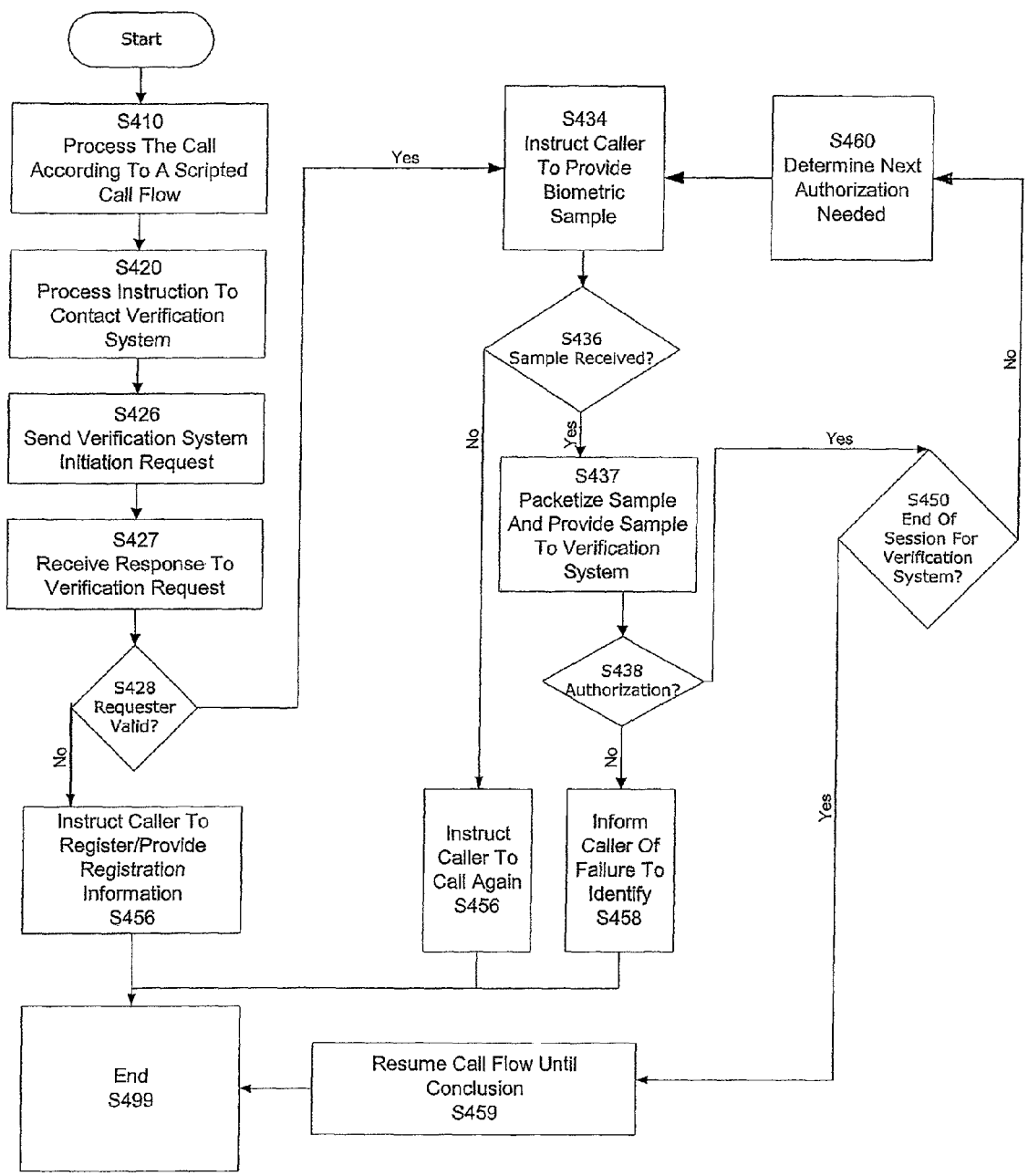
FIG. 4 is an exemplary flow diagram showing a method of operation for a communications platform that uses voice over IP based biometric authentication, according to an aspect of the present invention.

FIG. 4 shows an exemplary method of operation for a communications platform 150 that uses voice over IP based biometric authentication. After the process starts, an incoming call from the communications platform 150, 152 or 154 is answered and the call is processed according to a scripted call flow at S410. At S420, an instruction to contact the verification system 200 is processed. At S426, the communications platform 150, 152 or 154 sends the verification system 200 a request to initiate the authentication process. The request includes information of the requester that is used by the verification system 200 to determine whether the requester is valid.

At S427, the communications platform 150, 152 or 154 receives a response indicating whether the requester is valid. The communications platform 150, 152 or 154 determines whether the requester is valid based on the response at S428. If the requester is determined to be invalid (S428=No), the calling party is instructed to register and given registration information at S456, after which the process ends at S499.

If the requester is determined to be valid (S428=Yes), the calling party is instructed to provide a biometric sample at S434. For example, the calling party may be instructed to speak a specific phrase or series of sounds. The calling party may be instructed to repeat a term. At S436, the communications platform 150, 152 or 154 determines whether the biometric sample is provided. The process may wait for a specified time, e.g., of 10 seconds, before performing the determination at S436. If the sample is not received (S436=No), the calling party is instructed to call again at S456 and the process ends at S499. If the sample is received at S436 (S436=Yes), the communications platform 150, 152 or 154 packetizes the sample and provides the sample to the verification system 200 at S437.

At S438, the communications platform 150, 152 or 154 determines whether the calling party has been authorized by the verification system 200. If the calling party has not been authorized, the calling party is informed of the failure at S458 and the process ends at S499. If the calling party has been authorized to continue (S438=Yes), the communications platform 150, 152 or 154 determines at S450 whether the session with the verification system 200 has ended or whether the calling party needs another verification from the verification system 200. If the session with the verification system 200 has ended (S450=Yes), the call flow resumes at S459 until the process concludes at S499. However, if the session with the verification system has not ended (S450=No), the communications platform 150, 152 or 154 determines the next needed authorization at S460 and the process is renewed starting at S434 with an instruction to the calling party to provide a biometric sample.

Accordingly, the functionality of the verification system 200 is used to authorize a calling party to continue interacting with a communications platform 150, 152 or 154. The communications platform obtains biometric voice samples from the calling party, packetizes the samples, and forwards the packetized samples to the verification system 200.

As an example of the use of the voice over IP based biometric authentication, a bank with an intelligent peripheral communications platform 150 may wish to obtain specific verification of a calling party's identity before providing the calling party with information or an ability to make transactions. Accordingly, the verification system 200 may belong to a third party such as a telecommunications service provider or even a governmental agency. The verification system 200 may provide verification to the intelligent peripheral communications platform 150 by analyzing the voice sample and comparing the calling party's voice characteristics with voice characteristic information stored for a banking customer in order to determine whether the calling party is the banking customer. Accordingly, by calling the intelligent peripheral 150, the calling party may be able to obtain information such as an account balance. Further, the calling party may be authorized to make transactions from a remote location. Accordingly, the information in the speech characteristics database 210 is used by the verification system 200 to verify the identity of individual calling parties. As a result, the bank does not have to place trust in a calling party merely because the calling party has a password and account number.

As another example of the uses of the voice over IP based biometric authentication, a voicemail communications platform 152 may require verification of a calling party before allowing the calling party to access voicemails. In this regard, the voicemail system may require such verification for subscribers who request such verification for all voicemails. Alternatively, the voicemail system may offer calling parties who leave voicemail messages the option of ensuring that only the intended individual recipient can retrieve the voicemail messages.

Figure 5:
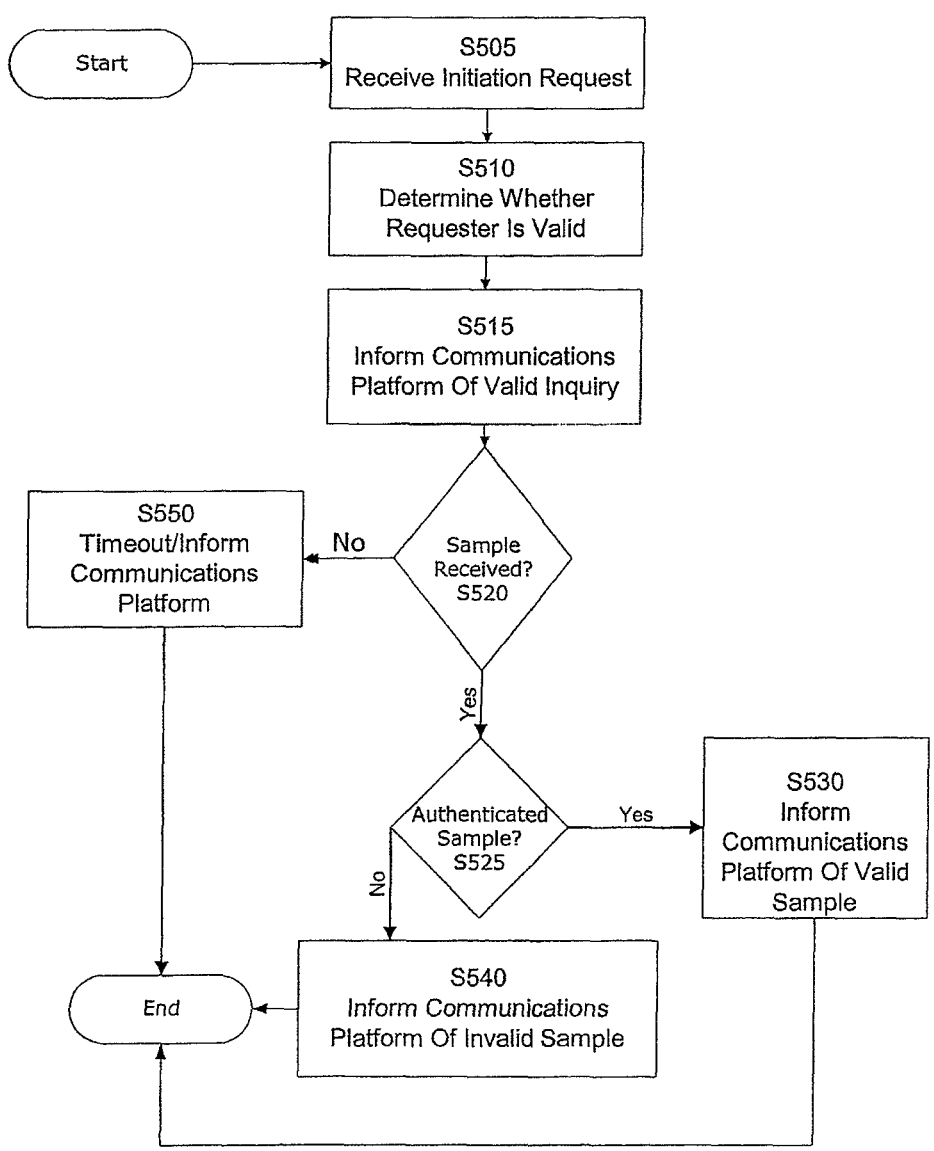
FIG. 5 is an exemplary flow diagram showing a method of operation for a verification system that provides voice over IP based biometric authentication, according to an aspect of the present invention.

FIG. 5 shows an exemplary method of operation for a verification system 200. At S505, the verification system 200 receives an initiation request. The initiation request may contain information indicating the purported identity of the calling party. At S510, the verification system 200 determines whether the requester is valid. For example, the verification system 200 may perform a check to determine whether the individual to be authenticated has been pre-registered. At S515, the verification system 200 informs the communications platform 150, 152 or 154 whether the inquiry has identified a valid subject.

At S520, the verification system 200 determines whether a packetized voice sample has been received from the communications platform 150, 152 or 154. For example, the verification system 200 may wait a predetermined period of time after informing the communications platform of the validity of the authentication request before making the determination at S520. If the time expires (S520=No), the verification system times out at S550 and the communications platform 150, 152 or 154 is informed of the timeout. After a timeout occurs, the process ends.

If a packetized voice sample has been received (S520=Yes), the verification system determines whether the sample is authentic at S525. If the verification system 200 authenticates the calling party as the proper individual (S525=Yes), the communications platform is informed at S530 and the process ends. If the verification system 200 cannot authenticate the calling party as the proper individual (S525=No), the communications platform is informed of the calling party's invalidity at S540 and the process ends.

An exemplary use of the voice over IP based biometric authentication is as a service provided by a business. For example, a communications platform 150, 152 or 154 may be provided by SBC Security. SBC Security may provide an authentication service for financial institutions. When customers of the financial institutions open an account, they are directed to register their biometric information with SBC Security. The customers may register by, e.g., calling an intelligent peripheral communications platform 150 that obtains initial voice characteristic information from the customers to be used to train the verification system 200 of the customer's voice characteristics. The customer may be directed to repeat a series of phrases, such as the customer's name. When the customer later needs to obtain authorization to perform financial transactions remotely, the customer contacts the intelligent peripheral communications platform 150 belonging to the financial institution. The communications platform 150, 152 or 154 instructs the customer to provide a biometric voice sample which is packetized and sent to the verification system 200 for authentication.

Of course, the voice over IP based biometric authentication may be used for many other purposes. As desribed above, the voice over IP based biometric authentication may be used to authenticate the identity of a calling party before enabling the calling party to change a service or conduct a transaction. Accordingly, the voice over IP based biometric authentication may be used in any environment where the functionality of a verification system 200 may be used to enhance the services of a communications platform 150, 152 or 154.

Figure 6:
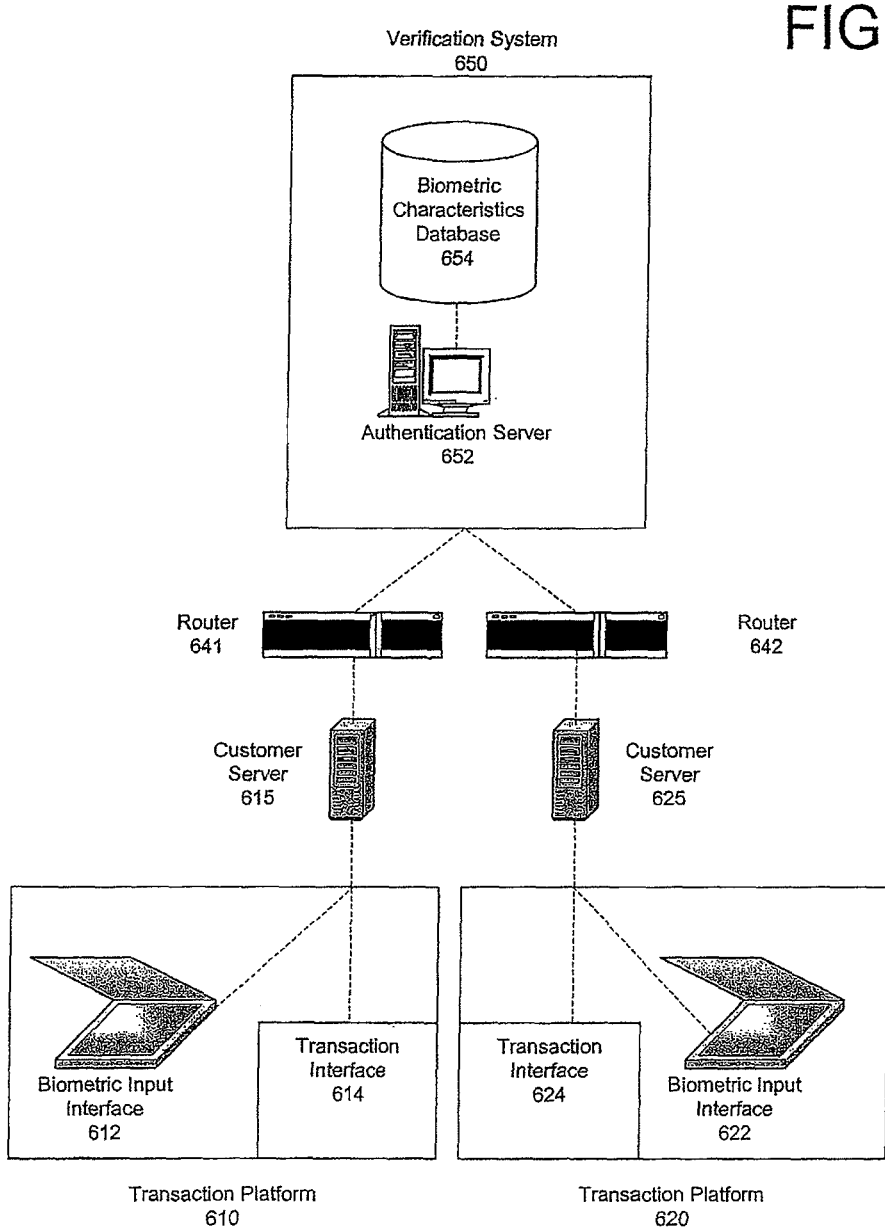
FIG. 6 is another exemplary communications network architecture for centralized biometric authentication, according to an aspect of the present invention.

FIG. 6 shows another exemplary communications network architecture for centralized biometric authentication. In the embodiment of FIG. 6, transaction platform 610 and transaction platform 620 are each connected through a computer network to a verification system 650. The transaction platforms 610 and 620 may belong to entirely different companies on entirely different networks. As an example, each transaction platform 610 and 620 may be an automatic teller machine (ATMs) or device that accepts credit cards.

The transaction platform 610 includes a biometric input interface 612 and a transaction interface 614. The transaction interface 614 may request the user to provide an account number and password, as well as a transaction request. The biometric input interface 612 is used to obtain biometric information from the user. For example, the biometric input interface may be a fingerprint scanner/touchpad that obtains a fingerprint image from the user. As in the embodiment of FIG. 1, the biometric input interface may be a telephone or other voice communications device.

In the exemplary embodiment of FIG. 6, customer servers 615, 625 provide functionality similar to the functionality of the communications platforms 150, 152 and 154 in the embodiment of FIG. 1. The information and requests from the user are processed by the customer servers 615, 625. Additionally, biometric information from the biometric interfaces 614, 624 is provided to the customer servers 615, 625 as data.

When the customer server 615 or 625 determines that the user's identity must be verified, the transaction platform 610, 620 uses the transaction interface 614, 624 to instruct the user to provide a biometric input. The biometric information (e.g., the fingerprint image or voice samples) is retrieved by the customer server 615 or 625 and routed through the network to the verification system 650.

In the embodiment of FIG. 6, the transaction platform 610 is in a private or virtual private network with the customer server 615. Similarly, the transaction platform 620 is in a private or private network with a customer server 625. The customer servers 615, 625 may each provide services and applications to numerous transaction platforms. For example, the customer server 615 may provide services and applications to multiple automatic teller machine transaction platforms 610. Additionally, the customer server 625 may provide services and applications to multiple credit card readers such as those provided on gas pumps.

The customer servers 615, 625 determine that the identity of a user of the transaction platforms 610, 620 must be authenticated before a transaction can be fulfilled or service provided to the user. Accordingly, the customer servers 615, 625 instruct the transaction interface 614, 624 to request that the user provide biometric information. For example, the user may be requested to press his fingers onto a finger scanner screen that is the biometric input interface 612, 622. Alternatively, the user may be requested to pick up a phone handset and speak a specified term.

Whatever biometric information is provided is packetized by the customer servers 615, 625 and forwarded to the verification system 650. The packetized biometric information is routed through a public network such as the internet to the verification system 650 via routers 641, 642.

The verification system 650 includes a biometric characteristics database 654 and an authentication server 652. The verification system 650 performs an analysis similar to the verification system 200 when the information is voice biometric information such as voice samples. In particular, the verification system 650 performs confidence checks to determine the probability that the biometric information properly identifies the user as a particular individual. Similarly, the verification system 650 may perform a fingerprint analysis when the information is a biometric fingerprint pattern.

The verification system 650 may provide services to numerous clients using numerous types of biometric information. Additionally, the verification system 650 may provide a centralized biometric service to numerous client systems and platforms. Of course, the verification system 650 may provide a centralized biometric service for only one client if warranted.

The verification system 650 initially obtains biometric information from the users by pre-registering the users. In this regard, the first time a user needs to register biometric information for the service, the user may be instructed to directly contact an authorized registrar, such as a bank officer, a representative of the user's employer, or any other person who will witness the initial registration of the user. In another embodiment, the user may be instructed to provide the biometric information when the user first validates a credit or debit card. In any case, the biometric information is used as the authentication and identification key for the user when the user subsequently needs identification.

Accordingly, the verification system 650 provides a centralized service to support the use of biometric technology to enable user identification, authentication and/or authorization. Although not described for each separate type of biometric, the biometric information may include voice, fingerprint, retina, genetic, facial, hand, palm, handwriting, iris, physical geometric techniques and/or any other identifying characteristic that is used to identify individuals. As described above, a person attempting to access a device or system may be required to provide biometric information such as a voice sample or a fingerprint scan before being allowed to access a system, change settings, or conduct a transaction. Furthermore, the system may identify an individual blindly (i.e., without information as to who the individual is supposed to be) by finding the best match candidate in a database without knowledge of who the individual claims to be. In other words, the system can be used to dynamically discover or establish the identity of the calling party. Alternatively, the system may authenticate a user only with respect to knowledge of the user's claimed identity, so that the biometric information is compared to only the biometric information corresponding to that identity.

Accordingly, the verification system 650 is centralized so that remote authentication of a person's identity can be performed using the person's biometric characteristic information. As described above, the centralized verification system 650 can remotely identify a party using a device to conduct a transaction or obtain a service. The centralized verification system 650 obtains the biometric information over a public packet-switching network such that a service may be provided for a subscribing entity to identify its employees or customers.

Figure 7:
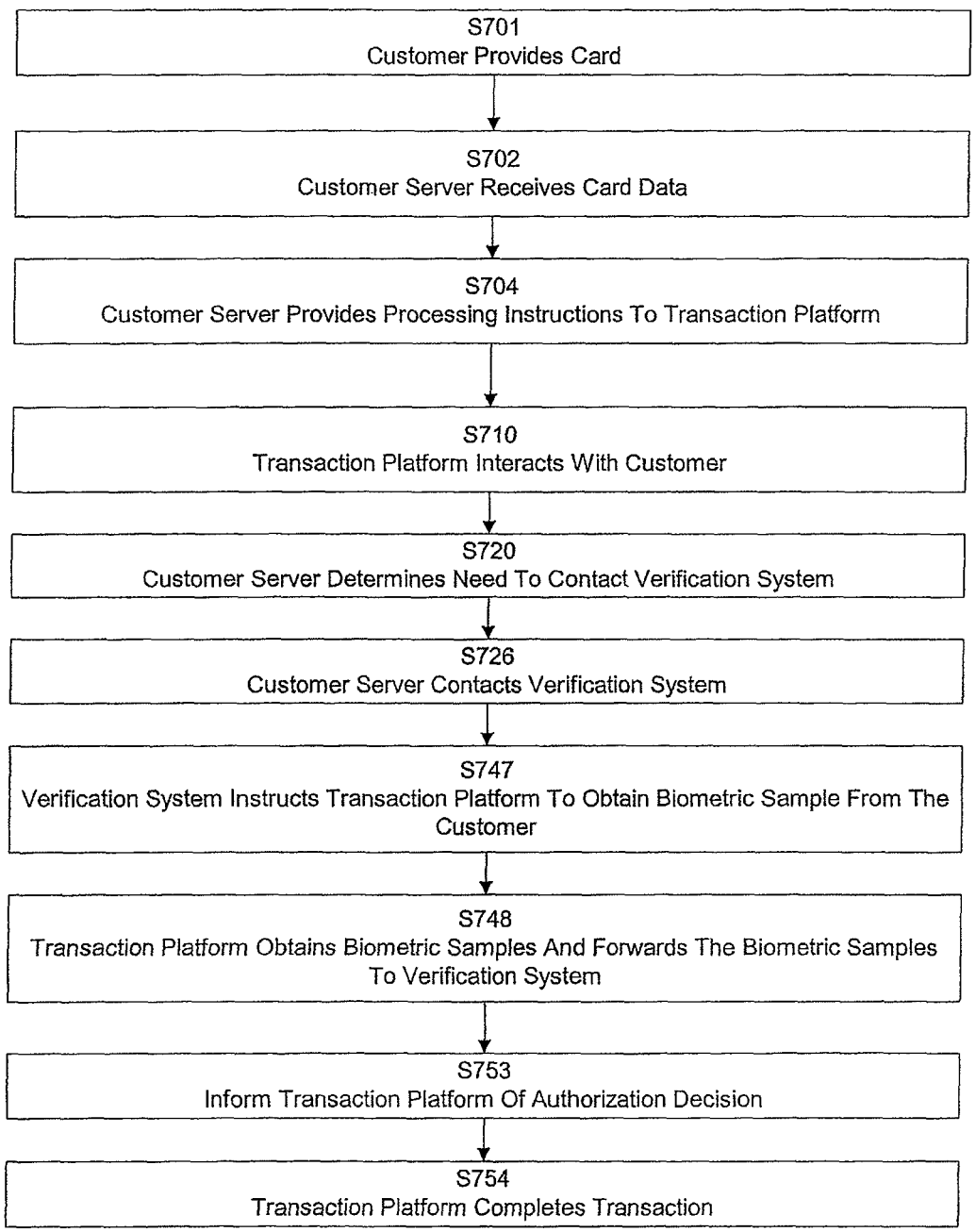
FIG. 7 is an exemplary flow diagram showing a method of authenticating an individual customer using centralized biometric authentication, according to an aspect of the present invention.

FIG. 7 shows an exemplary method of authenticating an individual customer using centralized biometric authentication. At S701, the customer provides a card, such as a credit card or ATM card, to the transaction interface 614 of the transaction platform 610. For example, the customer may insert the card into a designated slot or swipe the card through a card reader that reads a magnetic strip on the card. At S702, the transaction interface 614 forwards the card data to the customer server 615. The customer server 615 may be a centralized server, e.g., belonging to a bank, that interacts with numerous transactions platforms 610. The customer server 615 obtains customer records and determines what options may be provided to the customer.

At S704, the customer server 615 provides processing instructions to the transaction platform 610. The transaction interface 614 provides information to the customer and requests information from the customer, according to the processing instructions from the customer server 615. In this regard, the processing instructions may include an interactive script that determines which information should be presented to the customer. For example, if the customer chooses "withdraw cash", the transaction interface 614 may provide a cash withdrawal menu to the customer. Of course, the interactive script may be embedded with the transaction interface 614, such that it does not have to be provided by the customer server 615 with the processing instructions.

At S720, the customer server 615 determines a need to contact the verification system 650. The customer server 615 contacts the verification system 650 at S726. At S747, the verification system 650 instructs the transaction platform 610 to obtain a biometric sample from the customer. Of course, the instruction may be provided to the customer server 615 when the customer server 615 controls the transaction platform 610.

At S748, the transaction platform 610 obtains biometric samples from the customer and forwards the biometric sample information to the verification system 650. In particular, the customer interacts with the biometric input interface 612 in order to provide the biometric sample, and the biometric input interface 612 processes the biometric sample to obtain biometric sample information. For example, the customer may press a fingertip to a fingerprint scanner so that an image of the fingerprint is taken, in which case the image information is provided as the biometric sample information. Alternatively, the customer may speak as directed into a handset or speaker in order to provide voice information that is packetized as the biometric sample information.

The verification system 650 determines whether the biometric sample information is authentic, i.e., from the expected customer, at S753, and the transaction platform 610 is informed of the decision. At S754, the transaction platform 610 completes the transaction according to the interaction script, contingent on the authorization decision of the verification system 650.

According to the embodiment shown in FIG. 7, a customer using an ATM or credit card machine can be individually identified as the customer authorized to conduct a transaction, e.g., using credit. Of course, the functionality shown in FIG. 7 could be used to identify a customer anywhere, so long as a biometric input interface 612 is made available. In view of the widespread availability of the internet, the centralized verification system 650 may be used to identify an individual almost anywhere.

Figure 8:
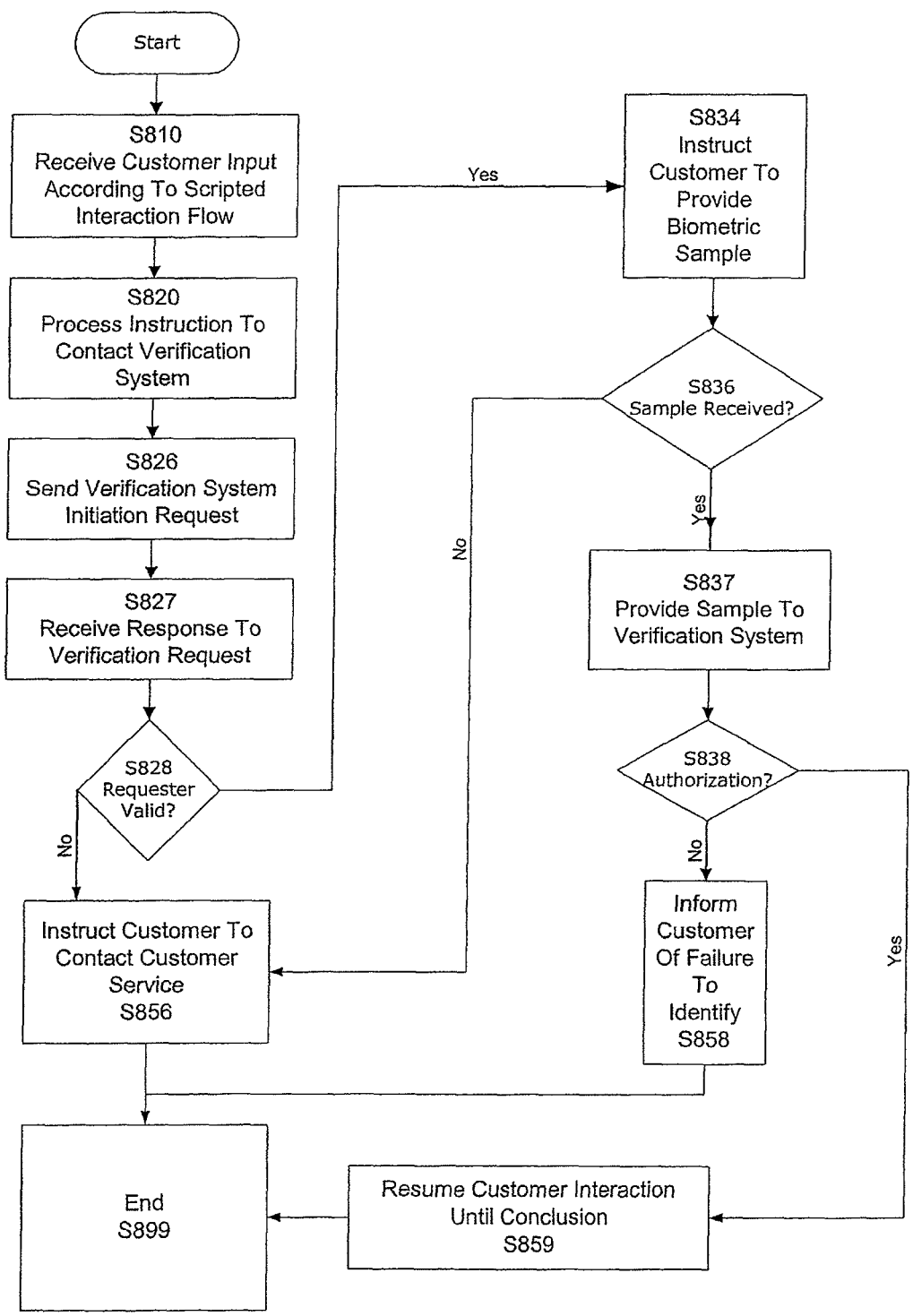
FIG. 8 is an exemplary flow diagram showing a method of operation for a transaction platform that uses centralized biometric authentication, according to an aspect of the present invention.

FIG. 8 shows an exemplary method of operation for a transaction platform 610 that uses centralized biometric authentication. At S810, a transaction interface 614 receives customer input and interacts with the customer according to a scripted interaction flow. At S820, an instruction to contact the verification system 650 is processed. A request to initiate a verification session is sent to the verification system 650 at S826. At S827, a response to the initiation request is received. At S828, a determination is made whether the response at S827 indicates that the requester is valid, i.e., pre-registered with the centralized verification system 650.

If the requester is not valid (S828=No), the customer is instructed to contact customer service at S856 and the process ends at S899. If the requester is valid (S828=Yes), the customer is instructed to provide a biometric sample at S834. At S836, the customer server 615 determines whether a sample was received via the biometric input interface 612. If a sample has not been received (S836=No), the customer is instructed to contact customer service at S856 and the process ends at S899. If a sample has been received (S836=Yes), the sample is provided to the verification system 650 at S837. A determination is made at S838 whether the verification system 650 has provided authorization for the transaction by authenticating the customer using the biometric sample. If authorization is received (S838=Yes), customer interaction resumes at S859 until the conclusion at S899. If authorization is not received (S838=No), the customer is informed of the failure to identify at S858 and the process ends at S899.

Accordingly, a transaction platform 610 can be used to individually identify a customer using a centralized biometric verification system 650. Of course, the transaction platform 610 is not provided only for ATM machines or credit card readers. Rather, a transaction platform 610 may include a personal computer that operates as the transaction interface 614. Further, a transaction platform 610 may include a biometric input interface 612 as an accessory to a personal computer or other personal networking device. In this regard, a voice over internet protocol enabled telephone may be used as a biometric input interface 612 to obtain a voice sample. For example, the customer may log into an application server that operates as the customer server 615, and the customer server 615 may request customer authentication when the customer attempts to conduct a transaction using the transaction interface 614.

Further, the centralized verification system 650 is not limited to use for only financial transactions. For example, the centralized verification system 650 may be used as a home monitoring system that monitors parolees. In this regard, if a parolee is subject to terms of release that require his presence at a specified address, the parolee's personal presence can be periodically verified by having the parolee log onto the internet, contact a monitoring server that operates as the customer server 615, and provide a biometric voice sample upon request. The customer's location may be verified using automatic number identification (ANI) or a fixed IP address, and the parolee's identity may be verified using the biometric sample.

Accordingly, the verification system 650 may be provided for any number of circumstances where an individual's identity must be remotely authenticated. The verification system 650 can be provided on a subscription basis for numerous intermediate service providers that correspond to the customer servers 615, 625. For example, multiple banks or other financial institutions may subscribe to the verification system 650 to ensure that customers can be authenticated. Alternatively, the verification system 650 may be used to authenticate customer identification for web sites that correspond to the customer servers 615, 625. The web sites may require biometric authentication of customers before allowing the customers to conduct transactions. However, the individual businesses may find the cost of providing biometric authentication prohibitive if they have to provide such a service alone. The centralized verification system 650 allows numerous customers and intermediate businesses to authenticate identities remotely, such that no one business need bear the entire cost of the verification system 650. Of course, in some cases the verification system 650 may be limited for the use of a single entity, such as a large telecommunications service provider, without unduly burdening the entity.

Accordingly, the centralized biometric verification system 200 or 650 can be accessed over many types of networks, including traditional public switched telephone networks or advanced intelligent networks, data networks such as the Internet, wireless networks, or any other networks that are capable of carrying biometric information. Furthermore, the biometric information may include voice information, fingerprint or palm information, or any other type of biometric information that can be input into any type of biometric input interface. For example, the biometric input interfaces may include phones, speakers, and fingerprint or palm scanners.

Further, as described above, a biometric voice sample can be provided via a switching network, as shown in FIG. 1. The voice sample can be packetized at a communications platform and sent to a verification system over a data network for identification/authentication. Accordingly, an individual may be identified from almost any location, so long as a networked biometric input device is provided for use. As a result, remote centralized biometric authentication may be widely provided in a manner not previously possible.

Of course, the steps shown in the figures may be performed in a different order, or not be performed at all. Additional steps may also be performed by the centralized biometric authentication methods. For example, S410 and S459 of FIG. 4 may each include a variety of interactions between the calling party and the communications platform 150, 152 or 154. Additionally, instead of instructing the caller to call again at S456, the process may loop back to S434 so that the caller is instructed to provide another biometric sample. Furthermore, the calling party may be identified and authenticated according to any biometric voice authentication system or method deemed acceptable by the provider of the verification system 200, including any later-developed system or method that is capable of identifying an individual based on biometric voice sample characteristic information.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims. For example, instead of using voice over IP packetization, a communications platform 150, 152 or 154 may packetize voice samples using multiprotocol label switching (MPLS) or any other standard for packet-switched communications.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for channeled network transmissions (e.g. BRI, PRI), packet switched network transmission (e.g., TCP, UDP, IP, VOIP, MPLS), and interface protocols (e.g., 3511) represent examples of the state of the art. Such standards are periodically superseded by faster or more efficient equivalents having essentially the same functions. Accordingly, replacement standards and protocols having the same functions are considered equivalents.

What is claimed is:

1. An apparatus, comprising:
   a receiver configured to receive from a remote system a request from a party attempting to obtain a service from the apparatus using the remote system;
   a processor configured to selectively determine when to request, over a network responsive to the request from the party attempting to obtain the service, authentication of the party by a remote biometric system; and
   a transmitter configured to transmit a request to the remote system for the party to provide a biometric sample responsive to the processor determining to request authentication of the party,
   wherein the processor is additionally configured to verify a purported identity of the party with the remote biometric system, and subsequently to provide the biometric sample to the remote biometric system for authentication, and
   wherein the service is provided contingent upon authentication of the party by the remote biometric system.

2. The apparatus of claim 1,
   wherein the biometric sample is packetized according to an internet protocol.

3. The apparatus of claim 1,
   wherein the apparatus receives the biometric sample from the remote system.

4. The apparatus of claim 1,
   wherein the apparatus processes the request from the party in accordance with a scripted call flow.

5. The apparatus of claim 1,
   wherein the apparatus comprises a telephony device.

6. The apparatus of claim 1,
   wherein the apparatus is within a communications network and intermediate to the remote system and the remote biometric system.

7. The apparatus of claim 1,
   wherein the service is provided using the remote system.

8. The apparatus of claim 6,
   wherein the apparatus comprises a voicemail communications platform in the communications network.

9. The apparatus of claim 6,
   wherein the apparatus comprises a wireless network communications platform in the communications network.

10. The apparatus of claim 1,
    wherein the service is provided using the apparatus.

11. A method for verifying an individual's identity, the method comprising:
    receiving, by an apparatus that includes a processor and a memory, a request from a remote system from a party attempting to obtain a service from the apparatus using the remote system;
    responsive to the request from the party attempting to obtain the service, selectively determining, by the processor, when to request, over a network, authentication of the party by a remote biometric system;
    verifying a purported identity of the party with the remote biometric system;
    transmitting a request to the remote system for the party to provide a biometric sample in response to the processor determining to request authentication of the party; and
    providing the biometric sample to the remote biometric system for authentication;
    wherein the service is provided contingent upon authentication of the party by the remote biometric system.

12. The method for verifying an individual's identity of claim 11,
    wherein the biometric sample is a voice biometric sample.

13. The method for verifying an individual's identity of claim 11,
    wherein the service is provided using the remote system and the apparatus.

14. The method for verifying an individual's identity of claim 11,
    wherein the remote biometric system performs a confidence check to determine a probability that the party is the individual based on the party providing the requested biometric sample.

15. The method for verifying an individual's identity of claim 11,
    wherein the biometric sample is a voice biometric sample and is packetized by the apparatus according to a voice over internet protocol.

16. A non-transitory computer readable medium that stores a program for verifying an individual's identity, the program when executed by a processor of an apparatus causing the apparatus to perform operations comprising:
- receiving a request from a remote system from a party attempting to obtain a service from the apparatus using the remote system;
- responsive to the request from the party attempting to obtain the service, selectively determining when to request, over a network, authentication of the party by a remote biometric system;
- verifying a purported identity of the party with the remote biometric system;
- transmitting a request to the remote system for the party to provide a biometric sample in response to determining to request authentication of the party; and
- providing the biometric sample to the remote biometric system for authentication;
- wherein the service is provided contingent upon authentication of the party by the remote biometric system.

17. The non-transitory computer readable medium of claim 16,
- wherein requests for the service are received by the apparatus from a plurality of parties attempting to obtain the service from a plurality of remote systems.

18. The non-transitory computer readable medium of claim 16,
- wherein the apparatus comprises a network communications platform, and
- wherein the remote biometric system authenticates parties for a plurality of network communications platforms.

19. The non-transitory computer readable medium of claim 16,
- wherein the apparatus transmits a plurality of requests to the remote system in a communication for the party to provide biometric samples.

20. The non-transitory computer readable medium of claim 16,
- wherein the remote system includes a transaction platform used by the public to conduct a financial transaction, and
- wherein the apparatus is selectively contacted by the transaction platform in order to complete the financial transaction.

* * * * *